(12) United States Patent
Choi et al.

(10) Patent No.: US 12,711,357 B2
(45) Date of Patent: Aug. 18, 2026

(54) METHOD FOR PROCESSING IMAGE THROUGH NEURAL NETWORK AND ELECTRONIC DEVICE THEREOF

(71) Applicant: Samsung Electronics Co., Ltd., Suwon-si (KR)

(72) Inventors: Jongbum Choi, Suwon-si (KR); Youngjun Kang, Suwon-si (KR); Daul Park, Suwon-si (KR); Hyunhee Park, Suwon-si (KR); Arang Lee, Suwon-si (KR); Jonghoon Won, Suwon-si (KR); Jaemyung Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 718 days.

(21) Appl. No.: 18/121,208

(22) Filed: Mar. 14, 2023

(65) Prior Publication Data

US 2023/0214632 A1 Jul. 6, 2023

Related U.S. Application Data

(63) Continuation of application No. PCT/KR2022/009347, filed on Jun. 29, 2022.

(30) Foreign Application Priority Data

Jun. 29, 2021 (KR) ........................ 10-2021-0084955

(51) Int. Cl.
*G06N 3/0464* (2023.01)
*G06T 3/4046* (2024.01)

(52) U.S. Cl.
CPC .......... *G06N 3/0464* (2023.01); *G06T 3/4046* (2013.01)

(58) Field of Classification Search
CPC .................................................... G06N 3/0464
See application file for complete search history.

(56) References Cited

U.S. PATENT DOCUMENTS 7,499,588 B2 3/2009 Jacobs et al.
9,436,895 B1 * 9/2016 Jones ....................... G06N 3/09
(Continued)

FOREIGN PATENT DOCUMENTS

JP H05204883 A 8/1993
JP 2002008033 A 1/2002
(Continued)

OTHER PUBLICATIONS

International Search Report with Written Opinion issued in International Application No. PCT/KR2022/009347; Application Filing Date Jun. 29, 2022; Date of Mailing Sep. 29, 2022 (10 pages).
(Continued)

*Primary Examiner* — Eric Nilsson
(74) *Attorney, Agent, or Firm* — CANTOR COLBURN LLP

(57) ABSTRACT

An electronic device may execute a neural network model for generating an image. Generating the image includes consecutively obtaining a plurality of frames by using a camera. A first frame among the plurality of frames may be presented to a first group of the neural network model, as a first input, and first result data corresponding to the first input stored in a memory. The first frame may be presented to a second group, as a second input. Upon determining that a second computation parameter of the second group is the same as a first computation parameter of the first group, the first result data is used as second result data corresponding to the second input, without performing a neural network computation that is based on the second group.

19 Claims, 11 Drawing Sheets

(56) References Cited

U.S. PATENT DOCUMENTS

| | | | |
|---|---|---|---|
| 10,755,126 B2 | 8/2020 | Son et al. | |
| 10,832,120 B2 | 11/2020 | Diamos et al. | |
| 2017/0103311 A1 | 4/2017 | Henry et al. | |
| 2018/0039480 A1 | 2/2018 | Komagata et al. | |
| 2018/0137647 A1* | 5/2018 | Li .................... | G06V 30/19173 |
| 2018/0189981 A1 | 7/2018 | Singh et al. | |
| 2019/0122107 A1 | 4/2019 | Young | |
| 2019/0130265 A1 | 5/2019 | Ling et al. | |
| 2021/0027142 A1 | 1/2021 | Kim et al. | |

FOREIGN PATENT DOCUMENTS

| | | | |
|---|---|---|---|
| JP | 2010538381 | A | 12/2010 |
| JP | 2018022339 | A | 2/2018 |
| JP | 7068398 | B2 | 5/2022 |
| KR | 20180050928 | A | 5/2018 |
| KR | 20180123846 | A | 11/2018 |
| KR | 20190022237 | A | 3/2019 |
| KR | 20190049593 | A | 5/2019 |
| KR | 20190052587 | A | 5/2019 |
| KR | 20190074938 | A | 6/2019 |
| KR | 101959376 | B1 | 7/2019 |
| KR | 20200049695 | A | 5/2020 |
| KR | 20200095300 | A | 8/2020 |
| KR | 20200137122 | A | 12/2020 |
| KR | 20210012083 | A | 2/2021 |
| WO | 2005024718 | A1 | 3/2005 |
| WO | 2009033944 | A1 | 3/2009 |
| WO | 2019164250 | A1 | 8/2019 |

OTHER PUBLICATIONS

Köpüklü, et al. “Convolutional neural networks with layer reuse” 2019 IEEE International Conference on Image Processing (ICIP). IEEE, Sep. 22, 2019 (pp. 345-349).

* cited by examiner

METHOD FOR PROCESSING IMAGE THROUGH NEURAL NETWORK AND ELECTRONIC DEVICE THEREOF

CROSS-REFERENCE TO RELATED APPLICATIONS

This application is a continuation application of International Application No. PCT/KR2022/009347 designating the United States, filed on Jun. 29, 2022, in the Korean Intellectual Property Receiving Office and claiming priority to Korean Patent Application No. 10-2021-0084955, filed on Jun. 29, 2021, in the Korean Intellectual Property Office, the disclosures of which are incorporated by reference herein in their entireties.

TECHNICAL FIELD

Embodiments disclosed in the present document relate to a method of processing an image through a neural network and an electronic device thereof.

BACKGROUND ART

An artificial intelligent system (or an integrated intelligence system) is a computer system that implements human-level intelligence, and is a system in which a machine learns and judges on its own. The more it is used, the more the accuracy, such as a recognition rate, improves. An artificial intelligence technology includes a machine learning (e.g., deep learning) technology that uses an algorithm that classify/learn the characteristics of input data by itself, and simulate a function such as cognition, judgment, etc. of a human brain by using a machine learning algorithm.

The machine learning technology can be used for applications that include, for example, at least one of a linguistic understanding technology of recognizing human language/script, a visual understanding technology of recognizing a thing like human eyes, a reasoning/prediction technology of logically reasoning and predicting by judging information, a knowledge expression technology of processing human experience information as knowledge data, and a motion control technology of controlling the autonomous driving of a vehicle and the movement of a robot.

An electronic device equipped with an artificial intelligent system can support a function of, in image processing, analyzing image data obtained through a camera, and performing the image processing through a neural network, and performing one or more operations based on the analyzed result.

DISCLOSURE

Technical Problem

When performing an image processing that includes several procedures for a consecutively inputted multi-frame by using a neural network, an electronic device can perform the same computation procedure in each procedure. However, when performing such an image processing for a multi-frame, the electronic device can perform a large amount of computations even though it is not necessary to perform the same computation procedure(s).

Various embodiments of the present disclosure present a method of analyzing an image processing structure through a neural network, identifying a computation procedure being repeated and storing the result of such a computation procedure, and using the stored result data without having to repeat the procedure, and an electronic device thereof.

Technical problems to be achieved in the present disclosure are not limited to the technical problems mentioned above, and other technical problems not mentioned can be clearly understood by those having an ordinary skill in the art to which the present invention belongs from the description below.

Technical Solution

An electronic device of an embodiment disclosed in the present document may include a camera, a memory, and at least one processor. The at least one processor may execute a neural network model for providing an image, the neural network model including a first group including at least a first computation layer among a plurality of computation layers and a second group including at least a second computation layer among the plurality of computation layers. The processor further consecutively obtains a plurality of frames by using the camera, and presents a first frame among the plurality of frames to the first group of the neural network model, as a first input. The processor stores first result data corresponding to the first input in the memory. The processor further presents the first frame to the second group, as a second input, and determines whether a second computation parameter of the second group is the same as a first computation parameter of the first group. If the second computation parameter and the first computation parameter are the same, the processor obtain the first result data as second result data corresponding to the second input, without performing a neural network computation that is based on the second group. If the second computation parameter and the first computation parameter are different from each other, the processor performs the neural network computation, based on the computation parameter of the second group, and obtain second result data distinguished from the first result data.

A method of operating an electronic device of an embodiment disclosed in the present document may include consecutively obtaining a plurality of frames by using a camera, and presenting a first frame among the plurality of frames to a first group of a neural network model, as a first input, and storing first result data corresponding to the first input in a memory. The method further includes presenting the first frame to a second group, as a second input, and determining whether a second computation parameter of the second group is the same as a first computation parameter of the first group. In response to the second computation parameter and the first computation parameter being the same, obtaining the first result data as second result data corresponding to the second input, without performing a neural network computation that is based on the second group, and, in response to determining that the second computation parameter and the first computation parameter are different from each other, the neural network computation is performed based on the computation parameter of the second group to obtain second result data distinguished from the first result data.

Advantageous Effects

According to various embodiments disclosed in the present document, because a part of a previously executed computation is stored and reused, an amount of computation of a neural network can be reduced.

Also, according to various embodiments, because all computations of the neural network are not performed, processing speed is improved.

In addition, various effects directly or indirectly identified through the present document may be presented.

MODE FOR INVENTION

Various embodiments of the present document will be described below with reference to the accompanying drawings. However, this is not intended to limit the present document to specific embodiments, and should be understood to include various modifications, equivalents, and/or alternatives of an embodiment of the present invention.

Figure 1:
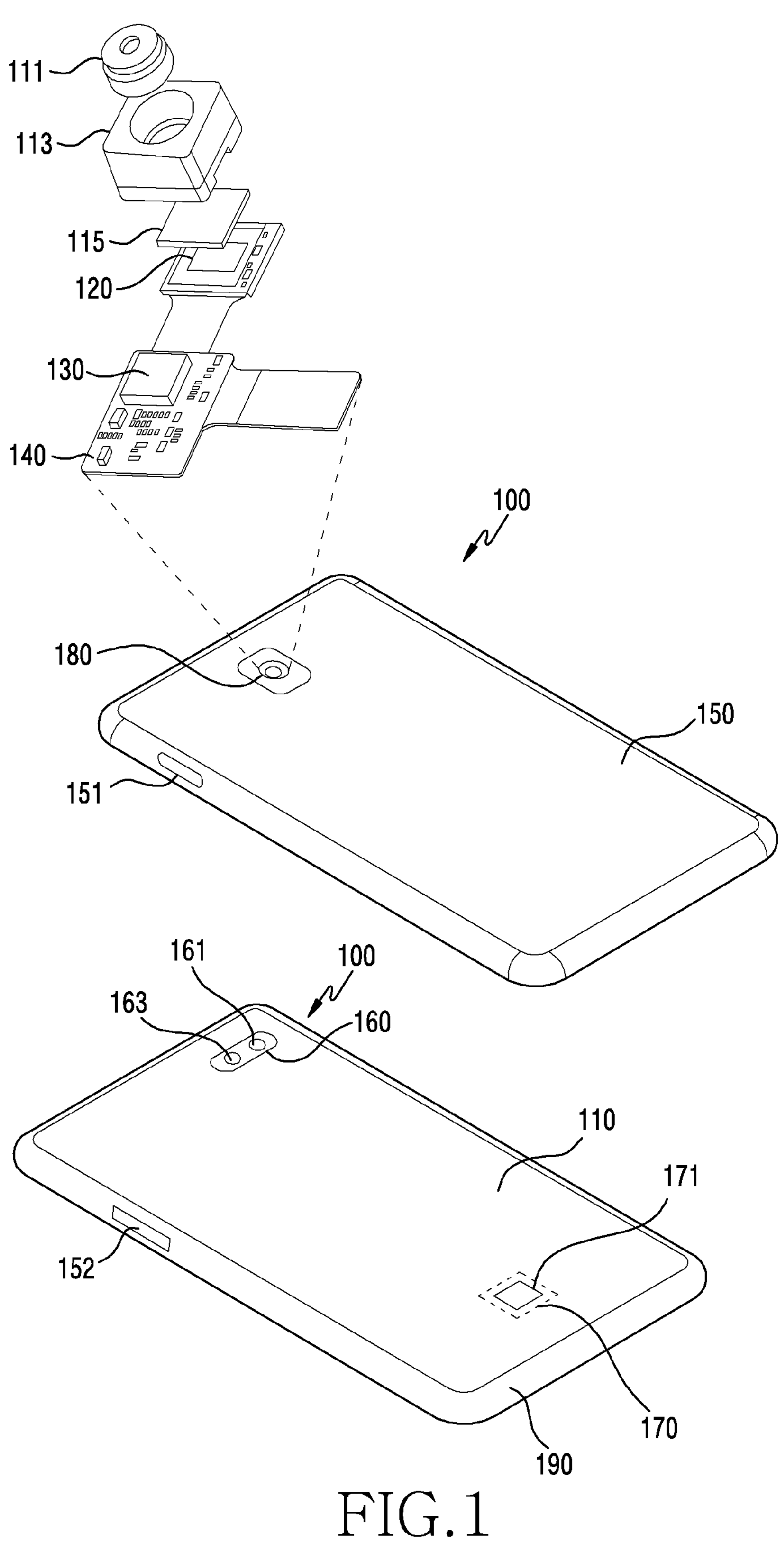
FIG. 1 is a diagram illustrating a structure of an electronic device and a camera according to an embodiment.

FIG. 1 is a diagram illustrating a structure of an electronic device and a camera according to an embodiment.

FIG. 1 is a schematic diagram showing an external view of an electronic device 100 (e.g., an electronic device 1001 of FIG. 10) equipped with a camera 180 (e.g., a camera module 1080 of FIG. 10), and the camera 180 according to an embodiment. Although the embodiment of FIG. 1 has been illustrated and described as a mobile device, in particular, a smart phone, technical solutions described herein may be applied to any electronic device equipped with a camera.

Referring to FIG. 1, a display 110 may be disposed on a front surface of the electronic device 100 of an embodiment. In an embodiment, the display 110 may occupy most of the front surface of the electronic device 100. A display 110 and bezel 190 region surrounding at least some edges of the display 110 may be disposed on the front surface of the electronic device 100. The display 110 may include a flat area, and a curved area extending from the flat area toward a side surface of the electronic device 100. The electronic device 100 illustrated in FIG. 1 is one example, and various embodiments are possible. For example, the display 110 of the electronic device 100 may include only the flat area without the curved area or may include the curved area only at an edge of one side instead of both sides. Also, in an embodiment, the curved area extends to a rear surface of the electronic device, so the electronic device 100 may include an additional flat area.

In an embodiment, the electronic device 100 may additionally include a speaker, a receiver, a front camera, a proximity sensor, a home key, and the like. The electronic device 100 of an embodiment may be presented in which a rear cover 150 is integrated with a main body of the electronic device as well. In another embodiment, the rear cover 150 may be separated from the main body of the electronic device 100, and have a form in which a battery may be replaced. The rear cover 150 may be referred to as a battery cover or a rear cover as well.

In an embodiment, a fingerprint sensor 171 for recognizing a user's fingerprint may be included in a first area 170 of the display 110. Because the fingerprint sensor 171 is disposed in a lower layer of the display 110, the fingerprint sensor 171 may not be recognized by a user or may be difficult to be recognized. Also, in addition to the fingerprint sensor 171, a sensor for additional user/biometric authentication may be disposed in a partial area of the display 110. In another embodiment, a sensor for user/biometric authentication may be disposed in one area of a bezel 190. For example, an IR sensor for iris authentication may be exposed through one area of the display 110 or may be exposed through one area of the bezel 190.

In an embodiment, a front camera 161 may be disposed in a second area 160 on the front surface of the electronic device 100. In the embodiment of FIG. 1, the front camera 161 is illustrated as being exposed through one area of the display 110, but in another embodiment, the front camera 161 may be exposed through the bezel 190. The electronic device 100 may include one or more front cameras 161. For example, the electronic device 100 may include two front cameras, such as a first front camera and a second front camera. In an embodiment, the first front camera and the second front camera may be cameras of the same type having the same specification (e.g., a pixel), but the first front camera and the second front camera may be implemented as cameras of different specifications. The electronic device 100 may support a function (e.g., 3D imaging, auto focus, etc.) related to a dual camera through two front cameras. The above-mentioned description of the front camera may be equally or similarly applied to a rear camera of the electronic device 100.

In an embodiment, in the electronic device 100, various hardware or sensors 163 to assist photographing, such as a flash, may be additionally disposed. For example, a distance sensor (e.g., a TOF sensor) for detecting a distance between a subject and the electronic device 100 may be further included. The distance sensor may be applied to both a front camera and/or a rear camera. The distance sensor may be separately disposed or included and be disposed in the front camera and/or the rear camera.

In an embodiment, at least one physical key may be disposed on a side portion of the electronic device 100. For example, a first function key 151 for turning on/off the display 110 or turning on/off the power of the electronic device 100 may be disposed at a right edge with respect to the front surface of the electronic device 100. In an embodiment, a second function key 152 for controlling a volume or a screen brightness, etc. of the electronic device 100 may be disposed at a left edge with respect to the front surface of the electronic device 100. In addition to this, an additional button or key may be disposed even on the front surface or rear surface of the electronic device 100. For example, a physical button or a touch button mapped to a specific function may be disposed in a lower area of the front bezel 190.

The electronic device 100 illustrated in FIG. 1 corresponds to one example, and does not limit a shape of a device to which a technical spirit disclosed in the present disclosure is applied. For example, by adopting a flexible display and a hinge structure, the technical spirit of the present disclosure may be applied even to a foldable electronic device that is foldable in a horizontal direction or is foldable in a vertical direction, a rollable electronic device that is rollable, a tablet or a notebook computer. In addition, the present technical spirit may be applied even when it is possible that the first camera and the second camera facing the same direction are disposed to face different directions through rotation of the device, folding, deformation, etc.

Figure 10:
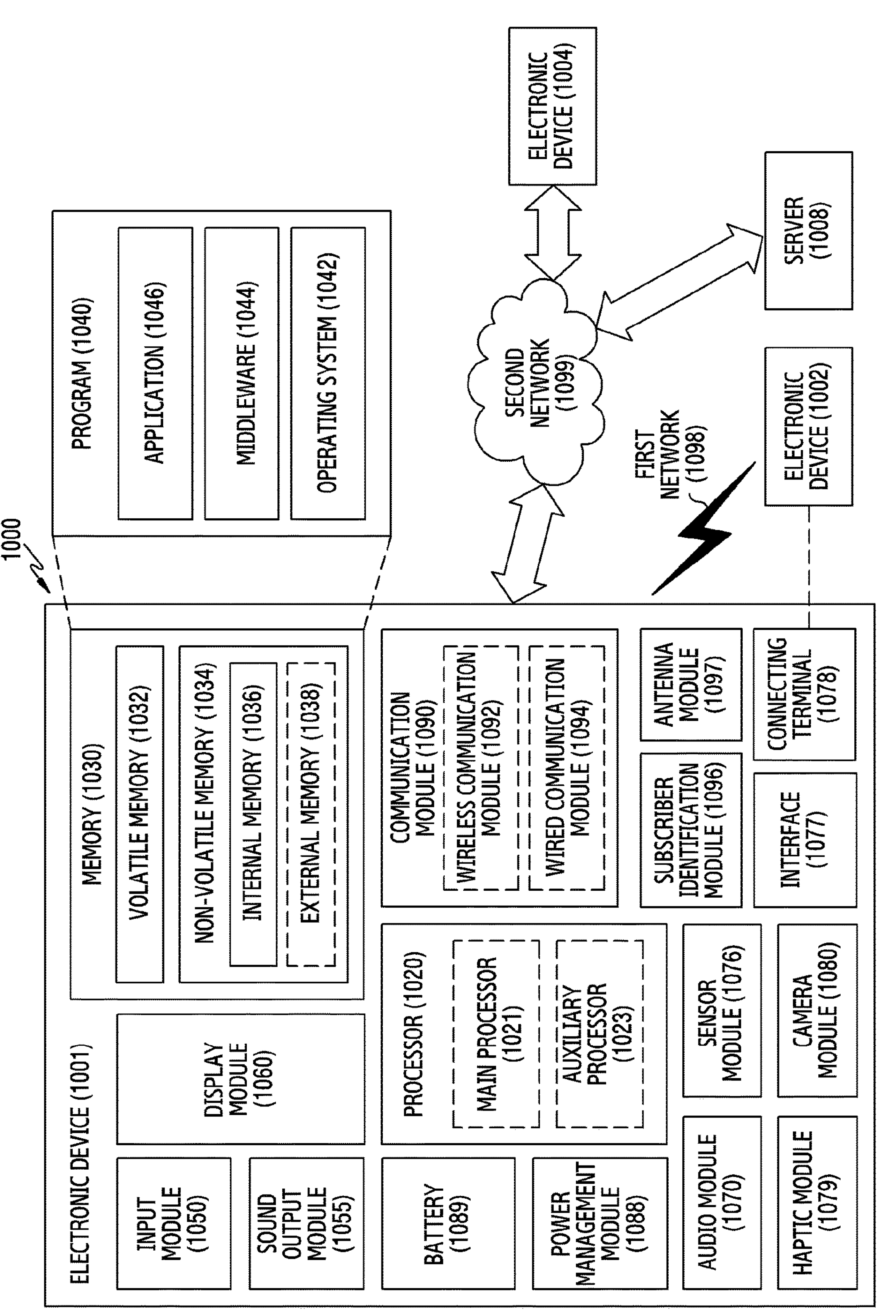
FIG. 10 is a block diagram of an electronic device in a network environment according to various embodiments.

Referring to FIG. 1, the electronic device 100 (e.g., an electronic device 1001 of FIG. 10) of an embodiment may include the camera 180 (e.g., a camera module 1080 of FIG. 10). The camera 180 may include a lens assembly 111 (e.g., a lens assembly 1110 of FIG. 11), a housing 113, an infrared cut filter 115, and an image sensor 120 (e.g., an image sensor 1130 of FIG. 11) and an image signal processor 130 (e.g., an image signal processor 1160 of FIG. 11).

In an embodiment, the lens assembly 111 may have different number, arrangement, type, etc. of lenses according to the front camera and the rear camera. According to the type of the lens assembly, the front camera and the rear camera may have different characteristics (e.g., a focal length, a maximum magnification, etc.). The lens may be moved forward and backward along an optical axis, and may operate wherein a target object, which is a subject, may be clearly captured by changing a focal length.

In an embodiment, the camera 180 may include a housing 113 which mounts a barrel mounting at least one or more lenses aligned on the optical axis and at least one coil surrounding a periphery of the barrel with respect to the optical axis.

In an embodiment, the infrared cut filter 115 may be disposed on an upper surface of the image sensor 120. An image of a subject passing through the lens may be partially filtered by the infrared cut filter 115 and then be detected by the image sensor 120.

In an embodiment, the image sensor 120 may be disposed on an upper surface of a printed circuit board. The image sensor 120 may be electrically connected to the image signal processor 130 connected to the printed circuit board 140 by a connector. A flexible printed circuit board (FPCB) or a cable, etc. may be used as the connector.

In an embodiment, the image sensor 120 may be a complementary metal oxide semiconductor (CMOS) sensor or a charged coupled device (CCD) sensor. A plurality of individual pixels are integrated in the image sensor 120, and each individual pixel may include a micro lens, a color filter, and a photodiode. Each individual pixel, which is a kind of photodetector, may convert inputted light into an electrical signal. The photodetector generally may not detect a wavelength of captured light by itself and may not determine color information. The photodetector may include a photodiode.

In an embodiment, light information of a subject incident through the lens assembly 111 may be converted into an electrical signal by the image sensor 120 and be input to the image signal processor 130.

In an embodiment, the camera 180 may be disposed on the front surface as well as the rear surface of the electronic device 100. Also, the electronic device 100 may include a plurality of cameras 180 as well as one camera 180 so as to improve camera performance. For example, the electronic device 100 may further include the front camera 161 for video call or self-camera photography. The front camera 161 may support a relatively small number of pixels compared to a rear camera module. The front camera may be relatively smaller than the rear camera module.

Figure 2:
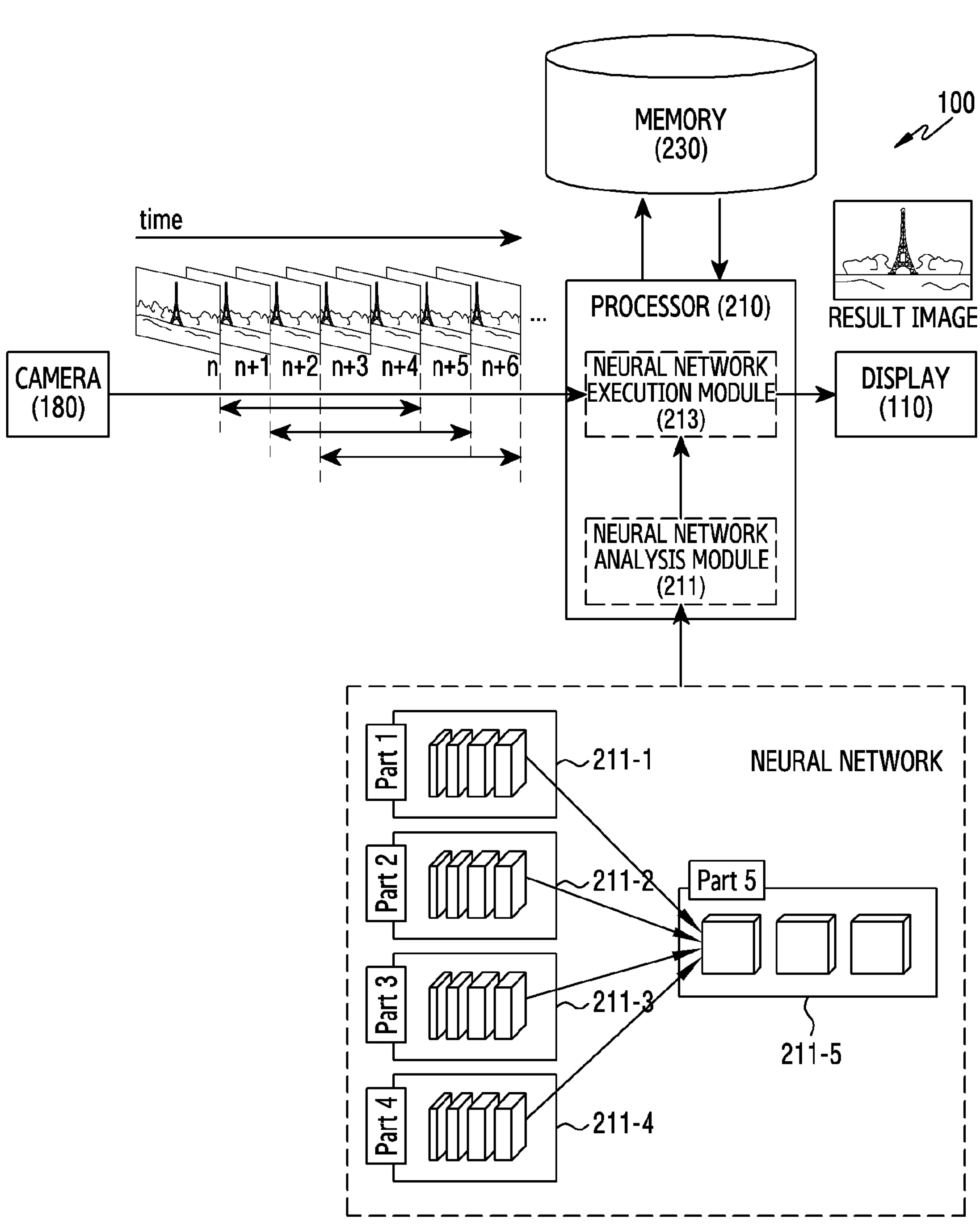
FIG. 2 illustrates a hardware construction and a software module of an electronic device according to an embodiment.

FIG. 2 illustrates a hardware construction and a software module of an electronic device according to an embodiment. In a description of FIG. 2, the construction illustrated in FIG. 1 may be briefly described or a description thereof may be omitted.

Referring to FIG. 2, the electronic device 100 may use a hardware and/or software module in order to support functions for applying an effect to an image. For example, by executing instructions stored in a memory 230, the processor 210 may drive a neural network analysis module 211 and a neural network execution module 213. In various embodiments, software modules other than those shown in FIG. 2 may be implemented. For example, at least two modules may be integrated into one module, or one module may be divided into two or more modules. In addition, work performance may be improved by sharing a function between hardware and software modules. For example, the electronic device 100 may include both an encoder implemented as hardware and an encoder implemented as a software module, and a part of data obtained through at least one camera module may be processed in the hardware encoder, and the other part may be processed in the software encoder. Also, a connection relationship between the hardware/software illustrated in FIG. 2 is for description convenience's sake, and does not limit a flow/direction of data or commands. Components included in the electronic device 100 may have various electrical/operative connection relationships.

In an embodiment, the processor 210 may obtain an image frame (or a frame) through the camera 180. The processor 210 may consecutively (or sequentially) obtain a plurality of frames (or multi-frames) through the camera 180. For example, the processor 210 may sequentially obtain an nth frame, an n+1st frame, and an n+2nd frame.

In an embodiment, the processor 210 may provide a result image by using the plurality of obtained frames. In some embodiments, a subset of the obtained frames may be used to generate the result image. In some embodiments, more than one result image is generated using different combinations of the obtained frames. For example, the processor 210 may provide a first result image by using the nth frame to an n+4th frame. The processor 210 may provide a second result image by using the n+1st frame to an n+5th frame.

In an embodiment, the processor 210 may use a neural network model to generate the result image(s). According to an embodiment, the neural network model may include at least one group. At least one group of an embodiment may each include at least one layer. The at least one layer may be a linear layer (e.g., a convolution layer) or a non-linear layer (e.g., a polling layer). In an embodiment, the processor 210 may perform a neural network computation through a convolution layer. In an embodiment, the convolution layer may provide a feature vector, based on an inputted value. For example, the convolution layer may provide a feature vector corresponding to an inputted image signal.

According to an embodiment, a neural network may be included in an external device capable of communicating with the electronic device 100. For example, the neural network may be included in an intelligent server including the neural network and/or a structure for neural network learning. According to an embodiment, the processor 210 may transmit and/or receive data to and from an intelligent server that uses a neural network by using a communication circuit included in the electronic device 100. In an embodiment, the intelligent server may include a structure for using an artificial intelligent (AI) system. The artificial intelligent system may be a neural network-based system (e.g., a feedforward neural network (FNN), and/or a recurrent neural network (RNN)).

According to an embodiment, the processor 210 may perform a function related to artificial intelligence by using the intelligent server. For example, the processor 210 may perform an image providing operation, alone or together with the intelligent server, based on the obtained image signal.

In an embodiment, the processor 210 may perform image processing for an obtained image frame through a computation structure of groups (or layers) of the neural network model. For example, the processor 210 may sequentially perform computation processing for an nth frame through a first group 211_1, a second group 211_2, a third group 211_3, a fourth group 211_4, and/or a fifth group 211_5 of the neural network model.

In an embodiment, the memory 230 may store programs and/or data. For example, the memory 230 may store a computation parameter for a neural network, input data, and output data. In an embodiment, the processor 210 may perform a computation operation (e.g., a convolution computation), based on input data received from the memory 230, and store the computation result in the memory 230.

In an embodiment, the neural network analysis module 211 may analyze a structure of a neural network model. When the neural network model performs image processing for multiple frames including at least two or more frames, the neural network analysis module 211 may analyze a dependency between neural network groups processing each frame, and/or the match or non-match of a computation procedure. The neural network analysis module 211 may forward analyzed information to the neural network execution module 213.

In an embodiment, by using the dependency between the neural network groups and/or association information forwarded from the neural network analysis module 211, the neural network execution module 213 may store a computation procedure and/or a computation result, and reuse the stored procedure and/or result.

In an embodiment, the processor 210 may display the provided result image through at least a portion of the display 110. The processor 210 may output a plurality of generated result images as preview images. The processor 210 may display a continuous image such as a moving picture, based on the plurality of generated result images.

Figure 3:
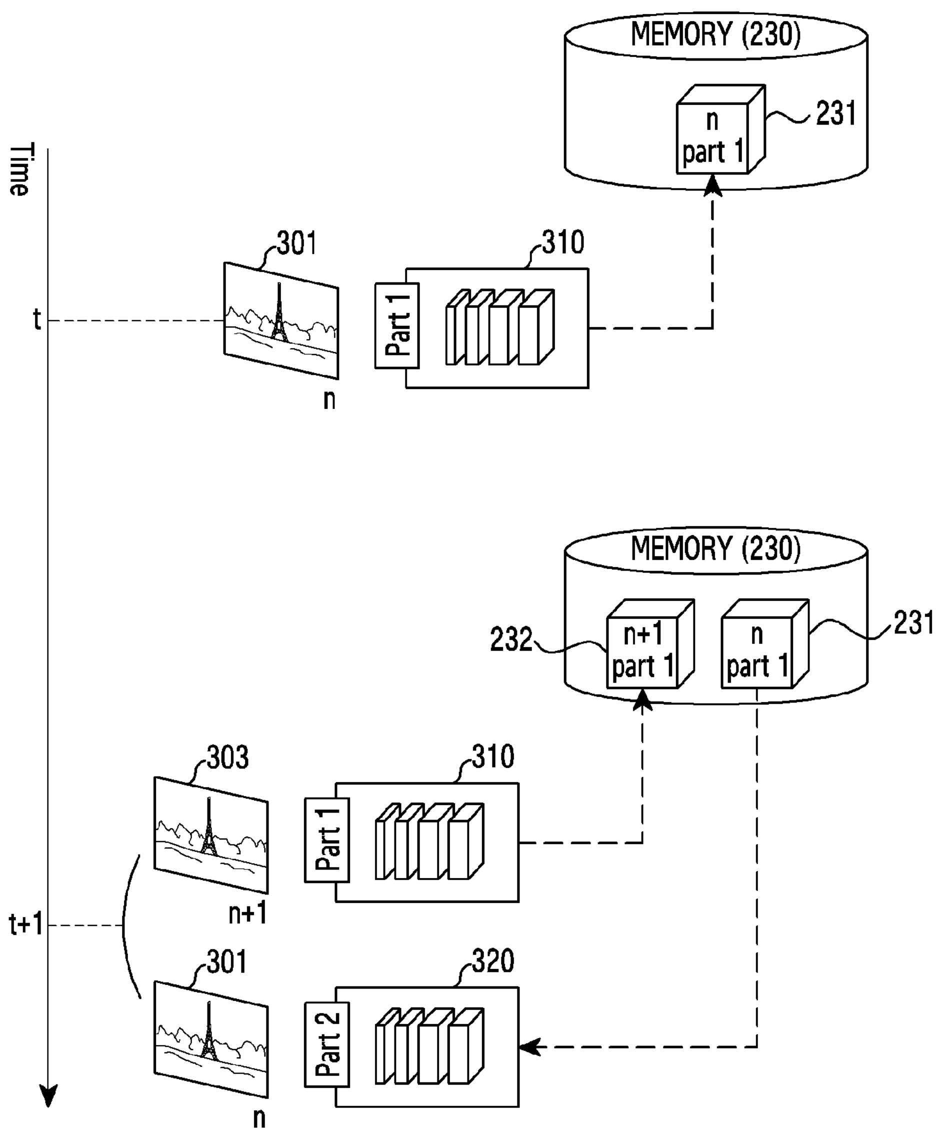
FIG. 3 is a diagram schematically illustrating a procedure of execution of a neural network model when obtaining a plurality of image frames in an electronic device according to an embodiment.

FIG. 3 is a diagram schematically illustrating a procedure of execution of a neural network model when an electronic device obtains a plurality of image frames according to an embodiment.

In an embodiment, the processor 210 may input an nth frame 301 to a first group 310 at time t. The processor 210 may perform a process for the nth frame 301 through a computation procedure of the first group 310. The processor 210 may input the nth frame 301 to a second group 320 and input an n+1st frame 303 to the first group 310, at time t+1.

In an embodiment, the processor 210 may store, in the memory 230, n_1st data 231 including a computation result and/or computation procedure of the first group 310 for the nth frame 301. This may be identically applied even to an n+1st frame. For example, the processor 210 may store, in the memory 230, n+1_1st data 232 including a computation result and/or computation procedure of the first group 310 for the n+1st frame 303. According to an embodiment, since the computation structures or computation procedures of the first group 310 and the second group 320 are the same, the processor 210 may use the same (already computed) result for the nth frame 301 in the second group 320, in a step in which the nth frame 301 must go through the second group 320. That the computation structures or computation procedures are the same may be understood as, for example, that a convolution computation process is the same and a weight value and a bias value used for convolution computation are the same. In another embodiment, when the computation structures of the first group 310 and the second group 320 are not the same, the processor 210 may input, to the second group 320, the nth frame 301 determined in the first group 310, without using the stored computation result. The above description may be equally applied even to the n+1st frame 303.

Below, the weight value and the bias value may be expressed as a weight value and a bias value, respectively.

Figure 4:
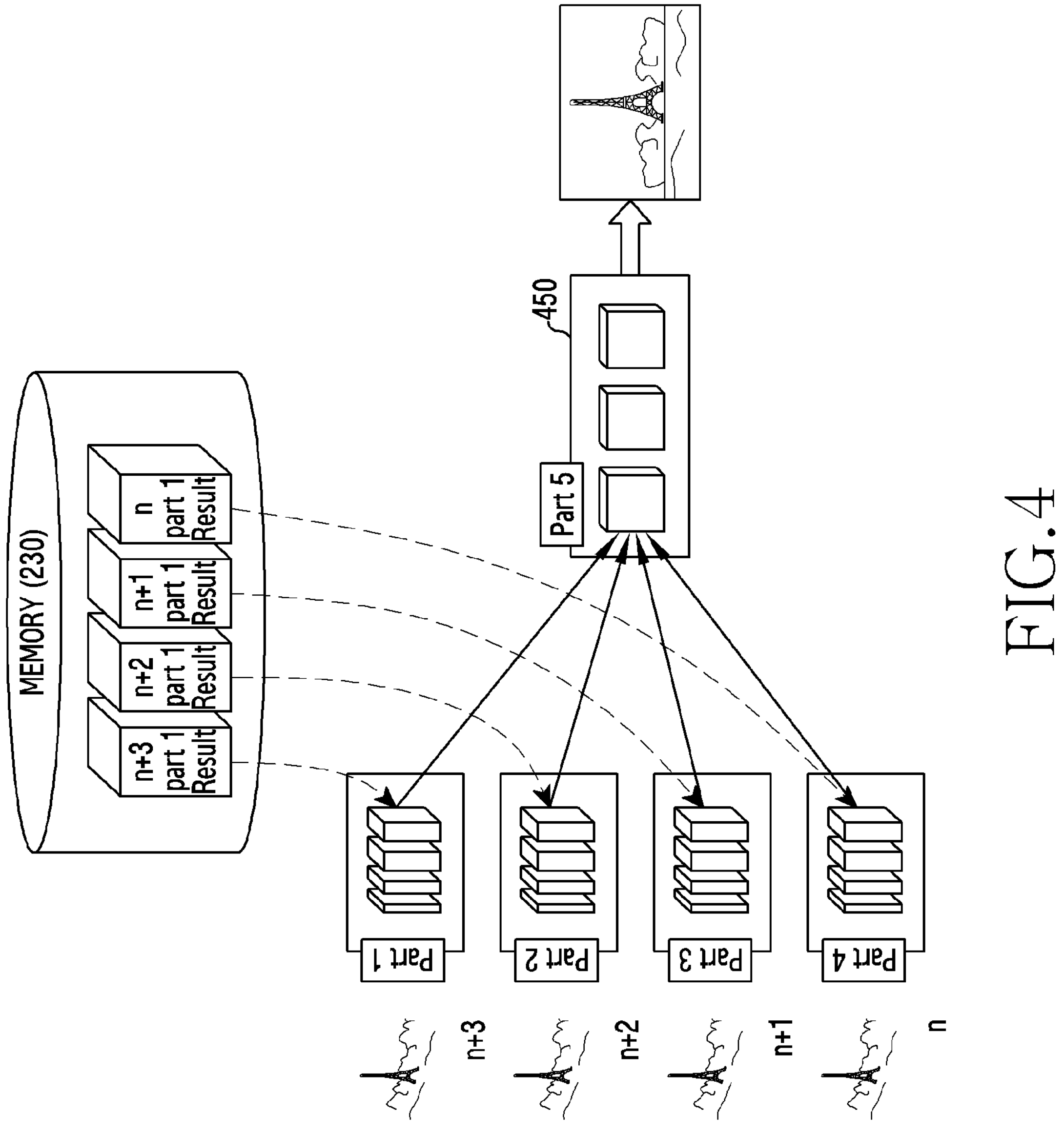
FIG. 4 illustrates that image processing is performed for a plurality of image frames when a computation procedure of each group of a neural network model is the same in an electronic device according to an embodiment.

FIG. 4 illustrates image processing for a plurality of image frames when a computation procedure of each group of a neural network model is the same in an electronic device according to the embodiment.

Referring to FIG. 4, in an embodiment, computation structures and/or computation procedures of the first group 410 to the fourth group 440 may be the same. Convolution weight value and bias value used in the computation procedures (e.g., convolution computation) of the first group 410 to the fourth group 440 may be the same.

In an embodiment, when consecutively inputted frames (e.g., an nth frame, an n+1st frame, an n+2nd frame, and an n+3rd frame) are sequentially inputted from the first group, the processor 210 may consecutively store the computation result of the first group 410, in the memory (e.g., a DRAM) 230. For example, when the nth frame is inputted to the first group 410 at time t, the processor 210 may store the computation result of the nth frame of the first group 410, in the memory 230. When the nth frame is inputted to the second group 420 and the n+1st frame is inputted to the first group 410 at time t+1, the processor 210 may store the computation result of the n+1st frame of the first group 410, in the memory 230.

In an embodiment, when frames inputted to the first group 410 are sequentially performed in the second group 420, the third group 430, and the fourth group 440, the processor 210 may obtain and use the computation result stored in the memory 230, without performing actual computation. For example, when the nth frame undergoes the computation of the fourth group 440, the computation result of the first group 410 for the nth frame may be obtained, and the computation result may be used as the computation result of the fourth group 440.

In an embodiment, after the frames go through up to the fourth group, one result image frame may be generated by the fifth group. In other words, one result image frame may be generated using the plurality of image frames (e.g., the nth frame to the n+4th frame) obtained through the camera 180. In an embodiments, different number of groups may exist.

Figure 5:
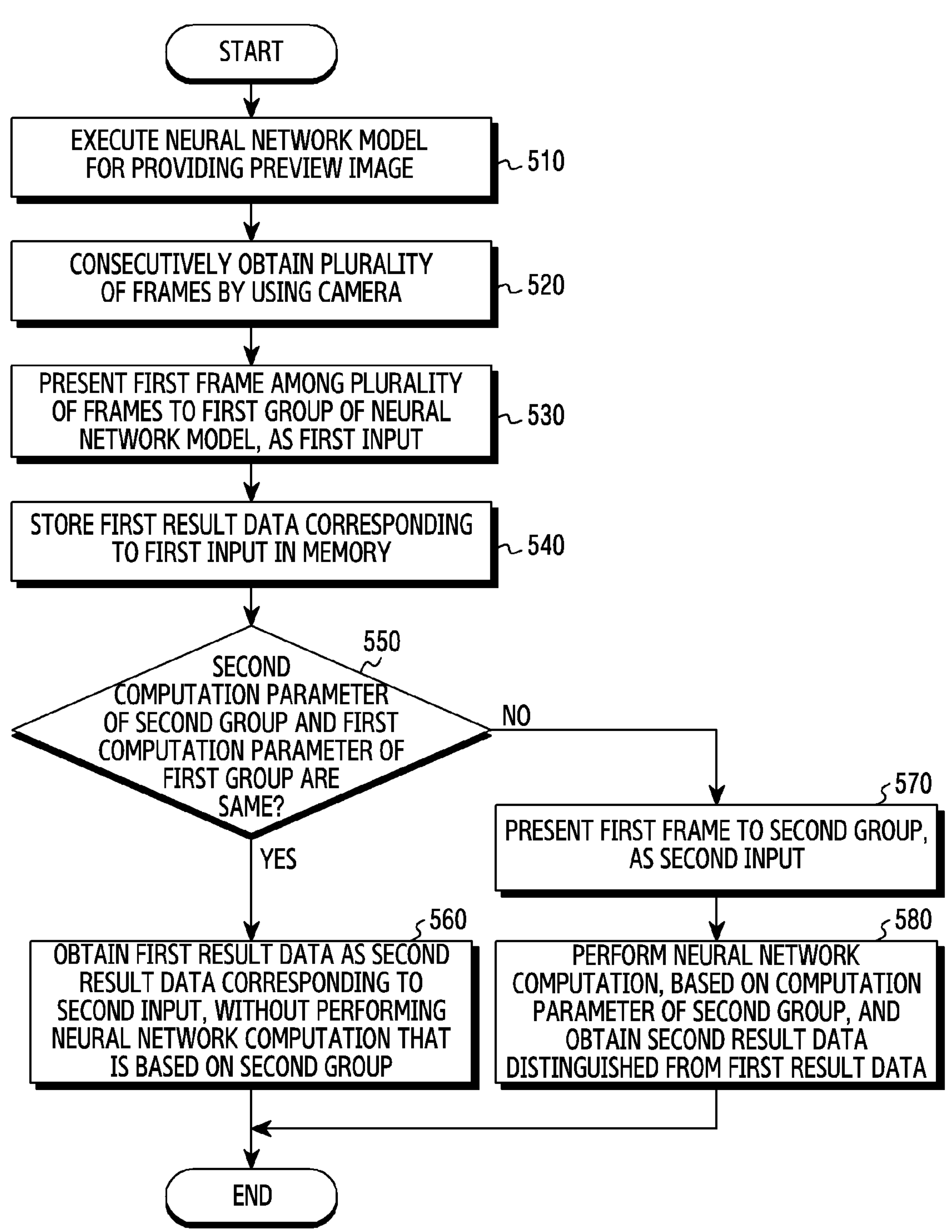
FIG. 5 is a flowchart for illustrating an operation procedure of a neural network model for providing a preview image in an electronic device according to an embodiment.

FIG. 5 is a flowchart illustrating an operation procedure of a neural network model for providing a preview image in an electronic device according to an embodiment.

In operation 510 of an embodiment, the processor 210 may execute a neural network model for providing a preview image. The neural network model may be a complex network model formed by a plurality of layers connected to each other. In an embodiment, the processor 210 may train the neural network model, and execute the obtained neural network model after the training is finished, and use for image processing. According to an embodiment, the neural network model may include at least one group and may include a structure for obtaining a plurality of input data. For example, the neural network model may include a first group and a second group. Hereinafter, it has been described that the neural network model includes the first group and the second group for description convenience's sake, but according to various embodiments, the number of groups included in the neural network model is not limited thereto. According to an embodiment, each group included in the neural network model may receive data and use a computation parameter (e.g., weight value, bias value), and may output result data through a computation procedure that is based on each group. For example, the first group may obtain a first input and output first result data. Also, the second group may obtain a second input and output second result data.

In operation 520 of an embodiment, the processor 210 may consecutively obtain a plurality of frames by using the camera 180. The processor 210 may consecutively obtain the plurality of frames according to a frame rate of an image sensor.

In operation 530 of an embodiment, the processor 210 may present a first frame among the plurality of frames to the first group of the neural network model, as a first input.

In operation 540 of an embodiment, the processor 210 may store the first result data corresponding to the first input in the memory 230. The processor 210 may output the first result data based on the first frame that is processed through the first group of the neural network model. The processor 210 may store the outputted first result data in the memory (e.g., a DRAM).

In operation 550 of an embodiment, the processor 210 may determine whether a second computation parameter of the second group and a first computation parameter of the first group are the same (e.g., equal). For example, the processor 210 may determine whether weight values and bias values used in the computation (e.g., convolution computation) of the neural network model are the same as each other.

In operation 560 of an embodiment, the processor 210 may obtain and use the first result data stored in the memory 230, as the second result data, without performing a neural network computation that is based on the second group.

In operation 570 of an embodiment, the processor 210 may present the first frame to the second group, as a second input. According to an embodiment, in operation 580, the processor 210 may perform a neural network computation, based on the computation parameter of the second group, and obtain the second result data distinguished/different/distinct from the first result data.

In other words, when the computation parameter of the first group and the computation parameter of the second group are the same/match/are equal, the processor 210 may obtain the first result data (computed using the first frame through the first group) as the second result data of the second group. As another example, when the computation parameter of the first group and the computation parameter of the second group are different from each other, the processor 210 presents the first frame to the second group, as the second input, and obtains the second result data in which the neural network computation is performed based on the computation parameter of the second group.

Figure 6:
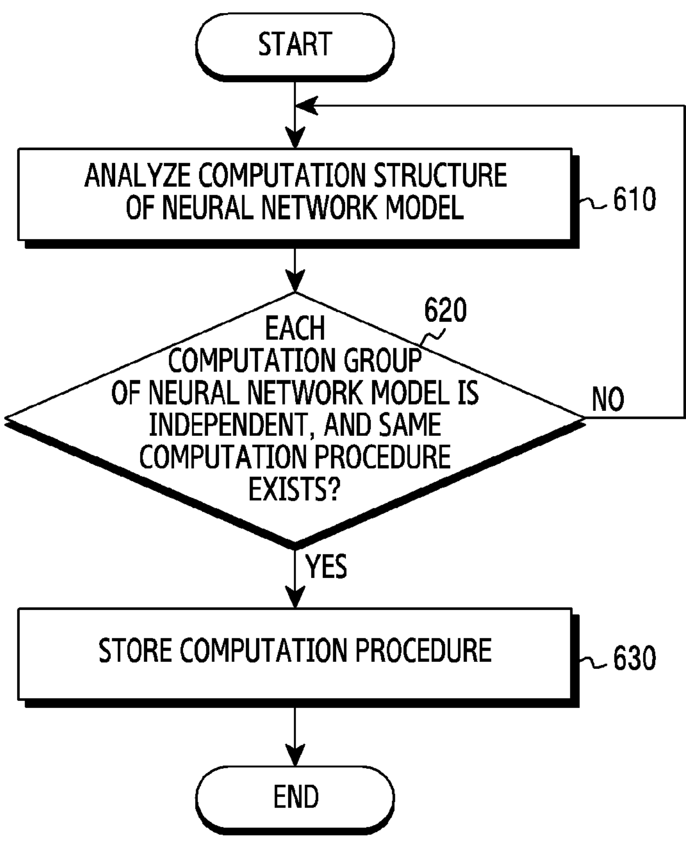
FIG. 6 is a flowchart illustrating a procedure of storing a computation result through a neural network model in an electronic device according to an embodiment.

FIG. 6 is a flowchart illustrating a procedure of storing a computation result through a neural network model in an electronic device according to an embodiment.

In operation 610 of an embodiment, the processor 210 may analyze a computation structure of the neural network model. The processor 210 may analyze a computation structure of each group included in the neural network model.

In operation 620 of an embodiment, the processor 210 may determine whether each computation group of the neural network model is independent and the same computation procedure exists. For example, the processor 210 may determine whether the first group and the second group of the neural network model are independent computation groups. The second group may be a computation group in which specific data is processed after the first group. For example, the processor 210 may determine whether the computation procedures of the first group and the second group of the neural network model are the same as each other. For example, the processor 210 may determine whether weight values and bias values used in the computation (e.g., convolution computation) procedures of the neural network model are the same as each other.

In operation 630 of an embodiment, the processor 210 may store the computation procedure. The processor 210 may provide reuse information about the computation procedure. When the computation procedures of the first group and the second group of the neural network model are the same as each other, and the weight values and the bias values used in the computation procedures are the same as each other, the processor 210 may provide reuse information about the computation procedure and/or computation result of at least one group (e.g., the first group or the second group).

Figure 7:
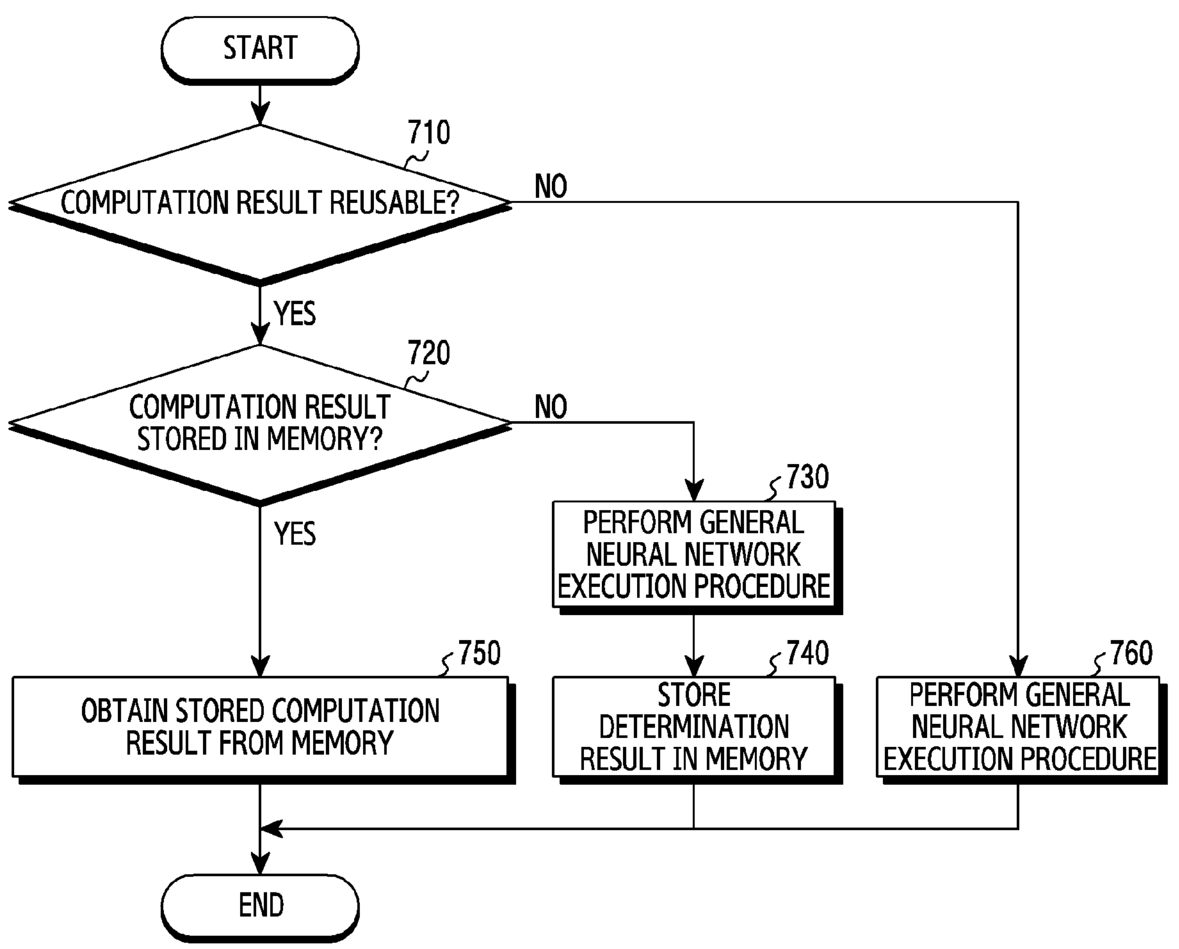
FIG. 7 is a flowchart illustrating a procedure of reusing a computation result stored through a neural network model in an electronic device according to an embodiment.

FIG. 7 is a flowchart illustrating a procedure of reusing a computation result stored through a neural network model in an electronic device according to an embodiment.

In operation 710 of an embodiment, the processor 210 may determine whether a computation result is reusable. The processor 210 may analyze a computation structure of a neural network and determine whether the computation result is reusable. When the computation result is not reusable, the processor 210 may perform operation 760, and when the computation result is reusable, the processor 210 may perform operation 720.

In operation 720 of an embodiment, the processor 210 may determine whether the computation result has been stored in the memory 230. For example, the processor 210 may determine whether the reusable computation result has been stored in the memory 230. According to an embodiment, when the reusable computation result has been stored in the memory 230, the processor 210 may perform operation 750, and when the computation result has not been stored in the memory 230, the processor 210 may perform operation 730 and operation 740.

According to an embodiment, when the reusable computation result has not been stored in the memory 230, in operation 730, the processor 210 may perform a general neural network execution procedure. Here, the general neural network procedure may mean performing image processing through a neural network, without using the computation result stored in the memory 230.

According to an embodiment, in operation 740, the processor 210 may perform a general neural network procedure and store the determination result in the memory 230.

In operation 750 of an embodiment, the processor 210 may obtain the stored computation result from the memory 230. The processor 210 may perform the following computation, based on the computation result obtained from the memory. For example, the processor 210 may output a stored result of the first group of the neural network as a result of the second group.

Figure 8:
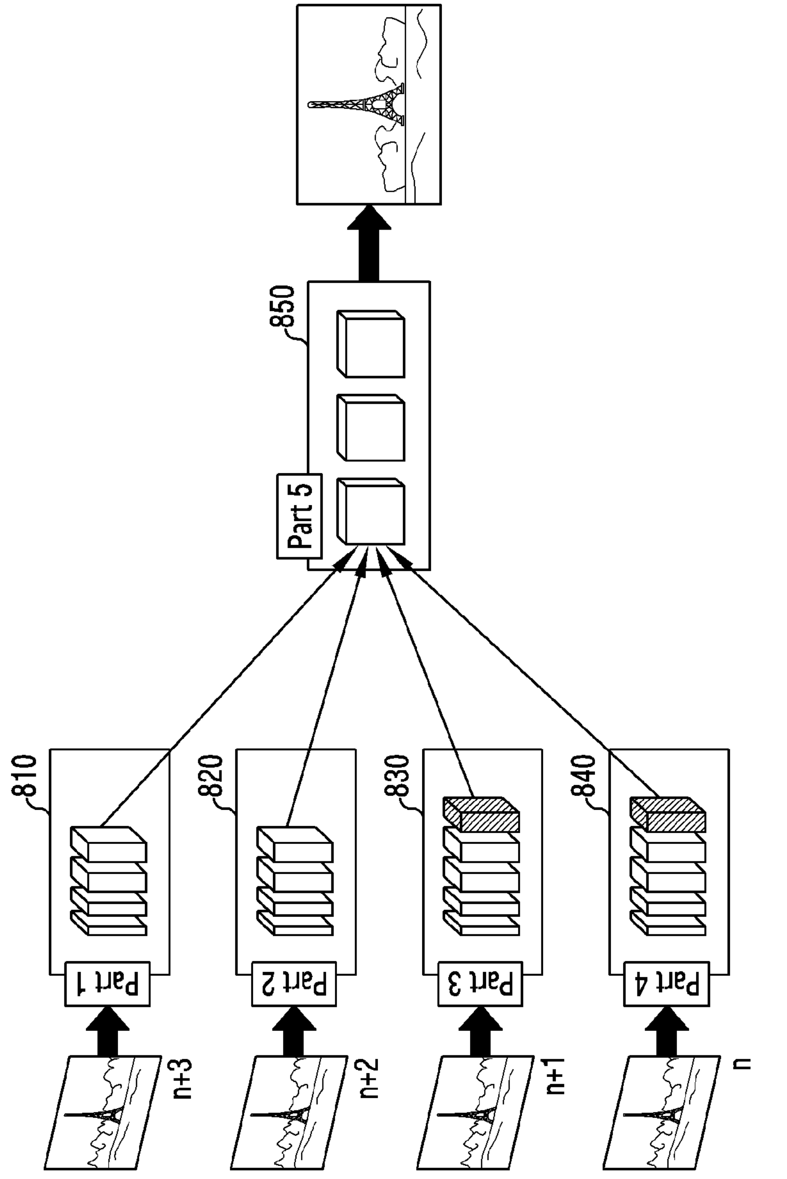
FIG. 8 illustrates the processing of a case where groups of a neural network model include the same computation procedure in an electronic device according to an embodiment.

FIG. 8 illustrates the processing of a case where groups of a neural network model include the same computation procedure in an electronic device according to an embodiment.

Referring to FIG. 8, the neural network model may include a first group 810, a second group 820, a third group 830, a fourth group 840, and a fifth group 850. The groups 810 to 850 may include a plurality of layers. In FIG. 8, each layer may mean a computation procedure and/or a computation parameter.

Referring to FIG. 8, in an embodiment, the first group 810 and the second group 820 of the neural network model may include the same computation procedure. For example, layers included in the first group 810 and the second group 820 of the neural network model may be the same as each other. In an embodiment, the second group 820 and the third group 830 of the neural network model may partially include the same computation procedure. For example, the layers of the second group 820 may be the same as at least some of layers of the third group 830. In an embodiment, the third group 830 and the fourth group 840 of the neural network model may include the same computation procedure. For example, layers included in the third group 830 and the fourth group 840 of the neural network model may be the same as each other.

In an embodiment, when image processing is performed by sequentially passing an input frame through each group 810 to 850, the processor 210 may use the determination result of a previous group, when computation procedures of each group are the same as each other, and weight values and bias values used in the computation procedures are the same as each other.

In an embodiment, referring to FIG. 8, when an nth frame is used as an input of the second group 820, the processor 210 may use the determined result and/or computation procedure of the first group 810 as the determined result and/or computation procedure of the second group 820. For example, when the first group 810 and the second group 820 include the same computation procedure, and weight values and bias values used in the computation procedure (e.g., convolution computation) are the same as each other, the processor 210 may use the determined result and/or computation procedure of the first group 810 as the result and/or computation procedure of the second group 820, without performing a computation on the second group 820 when the nth frame is used as the input of the second group 820.

In an embodiment, referring to FIG. 8, when the nth frame is used as an input of the third group 830, the processor 210 may partially use the determined result and/or computation procedure of the first group 810 in the third group 830. For example, when the second group 820 and the third group 830 include the partially same computation procedure, and weight values and bias values used in the computation procedure (e.g., convolution computation) are the same as each other, the processor 210 may use the determined result and/or computation procedure of the first group 810 as the intermediate determination result and/or intermediate computation procedure of the second group 820 when the nth frame is used as the input of the third group 830.

In an embodiment, referring to FIG. 8, when the nth frame is used as an input of the fourth group 820, the processor 210 may use the determined result and/or computation procedure of the third group 810 as the determined result and/or computation procedure of the fourth group 840. For example, when the third group 830 and the fourth group 840 include the same computation procedure, and weight values and bias values used in the computation procedure (e.g., convolution computation) are the same as each other, the processor 210 may use the determined result and/or computation procedure of the third group 830 as the determined result and/or computation procedure of the fourth group 840, without performing a computation of the fourth group having the nth frame as an input when the nth frame is used as the input of the fourth group 840.

Although the description of FIG. 8 above uses the nth frame, it may be identically applied to an n+1st frame, an n+2nd frame, and an n+3rd frame consecutively obtained after the nth frame.

Figure 9:
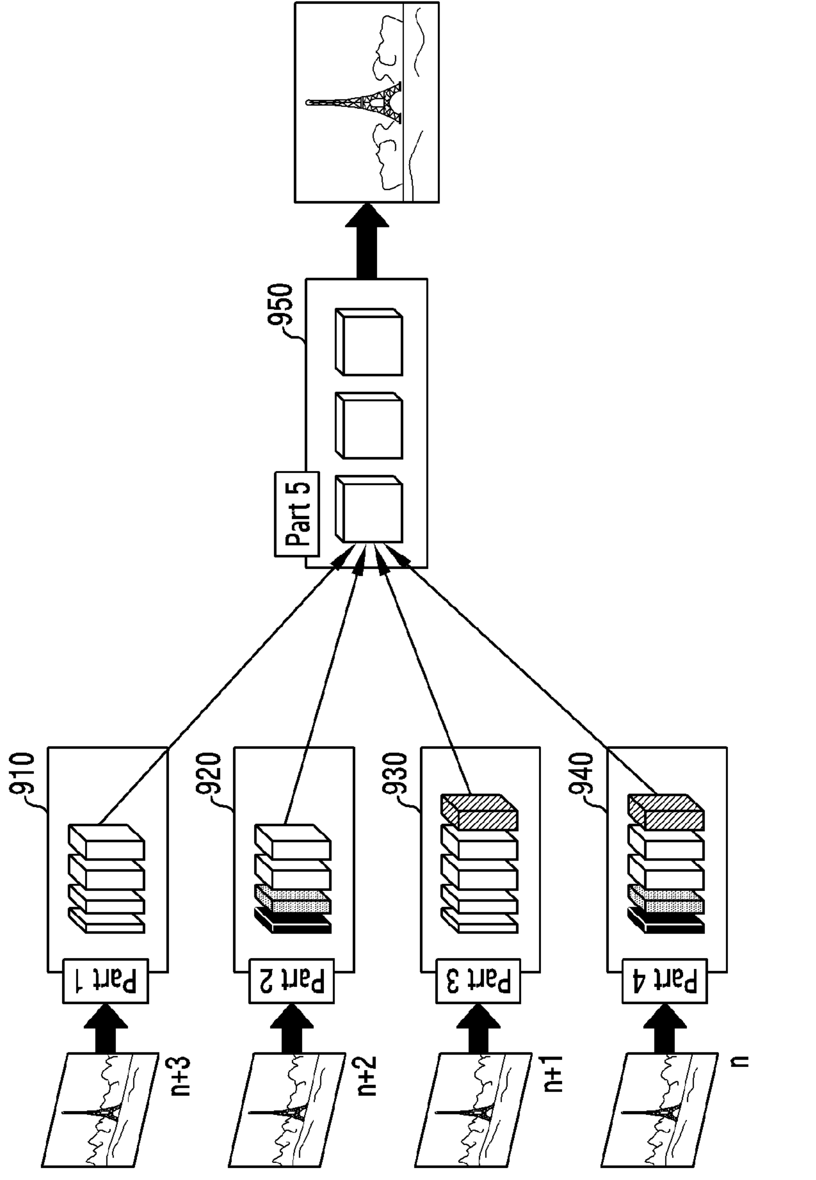
FIG. 9 illustrates the processing of a case where groups of a neural network model include the same computation procedure in an electronic device according to an embodiment.

FIG. 9 illustrates a case where groups of a neural network model include the same computation procedure in an electronic device according to an embodiment.

Referring to FIG. 9, the neural network model may include a first group 910, a second group 920, a third group 930, a fourth group 940, and a fifth group 950. The groups 910 to 950 may include a plurality of layers. In FIG. 9, each layer may mean a computation procedure and/or a computation parameter.

Referring to FIG. 9, in an embodiment, computation procedures of the first group 910 to the fourth group 940 of the neural network model may be different from each other. In other words, layers included in the first group 910 to the fourth group 940 may not be the same as each other. In an embodiment, the first group 910 and the third group 930 of the neural network model may be partially the same as each other. For example, layers of the first group 910 may be the same as at least some of layers of the third group 930. In an embodiment, the second group 920 and the fourth group 940 of the neural network model may be partially the same as each other. For example, layers of the second group 920 may be the same as at least some of layers of the fourth group 940.

In an embodiment, when image processing is performed by sequentially passing an input frame through each group 910 to 950, the processor 210 may use the determined result of a previous group, when computation procedures of each group are the same as each other, and weight values and bias values used in the computation procedures are the same as each other.

In an embodiment, referring to FIG. 9, the processor 210 may compute and process an nth frame as an input of the first group 910. Since the computation procedures of the first group 910 and the second group 920 are not the same or the weight values and bias values used in the computation procedures are not the same, the processor 210 may not use the determined result and/or computation procedure of the first group 910, in the second group 920. In other words, the processor 210 may compute and process the computation result of the first group 910 of the nth frame as an input of the second group 920.

In an embodiment, referring to FIG. 9, when the nth frame is used as an input of the third group 930, the processor 210 may use the determined result and/or computation procedure of the first group 910 as the intermediate computation result and/or intermediate computation procedure of the third group 930. For example, when computation procedures of the first group 910 and the third group 930, and/or weight values and bias values used in the computation procedures (e.g., convolution computation) are matched with each other only in a specific portion, the processor 210 may reuse the determined result and/or computation procedure of the first group 910 up to the matching portion, without performing the same portion of the third group 930 as that of the first group 910.

In an embodiment, referring to FIG. 9, when the nth frame is used as an input of the fourth group 940, the processor 210 may use the determined result and/or computation procedure of the second group 920 as the intermediate computation result and/or intermediate computation procedure of the fourth group 940.

Although the description of FIG. 9 above uses the nth frame, it may be identically applied to the n+1st frame, the n+2nd frame, and the n+3rd frame consecutively obtained after the nth frame.

FIG. 10 is a block diagram illustrating an electronic device 1001 in a network environment 1000 according to various embodiments.

Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

Figure 11:
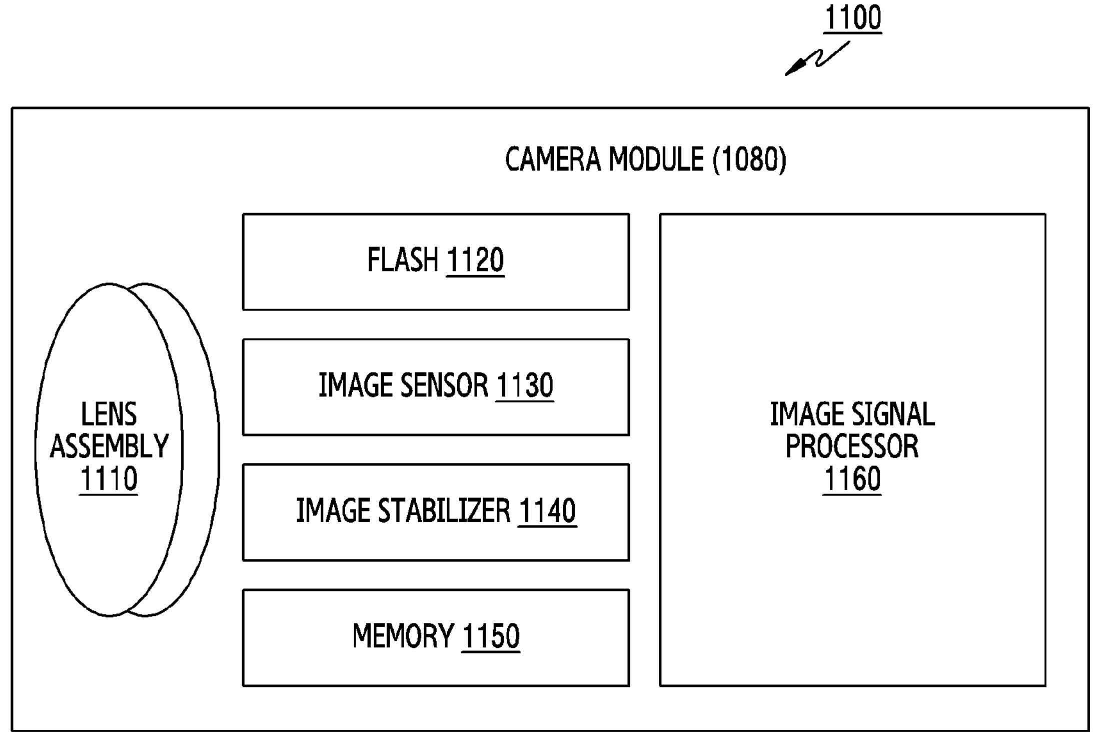
FIG. 11 is a block diagram illustrating a camera module according to various embodiments.

FIG. 11 is a block diagram 1100 illustrating the camera module 1080 according to various embodiments. Referring to FIG. 11, the camera module 1080 may include a lens assembly 1110, a flash 1120, an image sensor 1130, an image stabilizer 1140, memory 1150 (e.g., buffer memory), or an image signal processor 1160. The lens assembly 1110 may collect light emitted or reflected from an object whose image is to be taken. The lens assembly 1110 may include one or more lenses. According to an embodiment, the camera module 1080 may include a plurality of lens assemblies 1110. In such a case, the camera module 1080 may form, for example, a dual camera, a 360-degree camera, or a spherical camera. Some of the plurality of lens assemblies 1110 may have the same lens attribute (e.g., view angle, focal length, auto-focusing, f number, or optical zoom), or at least one lens assembly may have one or more lens attributes different from those of another lens assembly. The lens assembly 1110 may include, for example, a wide-angle lens or a telephoto lens.

The flash 1120 may emit light that is used to reinforce light reflected from an object. According to an embodiment, the flash 1120 may include one or more light emitting diodes (LEDs) (e.g., a red-green-blue (RGB) LED, a white LED, an infrared (IR) LED, or an ultraviolet (UV) LED) or a xenon lamp. The image sensor 1130 may obtain an image corresponding to an object by converting light emitted or reflected from the object and transmitted via the lens assembly 1110 into an electrical signal. According to an embodiment, the image sensor 1130 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1130 may be implemented using, for example, a charged coupled device (CCD) sensor or a complementary metal oxide semiconductor (CMOS) sensor.

The image stabilizer 1140 may move the image sensor 1130 or at least one lens included in the lens assembly 1110 in a particular direction, or control an operational attribute (e.g., adjust the read-out timing) of the image sensor 1130 in response to the movement of the camera module 1080 or the electronic device 1001 including the camera module 1080. This allows compensating for at least part of a negative effect (e.g., image blurring) by the movement on an image being captured. According to an embodiment, the image stabilizer 1140 may sense such a movement by the camera module 1080 or the electronic device 1001 using a gyro sensor (not shown) or an acceleration sensor (not shown) disposed inside or outside the camera module 1080. According to an embodiment, the image stabilizer 1140 may be implemented, for example, as an optical image stabilizer.

The memory 1150 may store, at least temporarily, at least part of an image obtained via the image sensor 1130 for a subsequent image processing task. For example, if image capturing is delayed due to shutter lag or multiple images are quickly captured, a raw image obtained (e.g., a Bayer-patterned image, a high-resolution image) may be stored in the memory 1150, and its corresponding copy image (e.g., a low-resolution image) may be previewed via the display device 1060. Thereafter, if a specified condition is met (e.g., by a user's input or system command), at least part of the raw image stored in the memory 1150 may be obtained and processed, for example, by the image signal processor 1160.

According to an embodiment, the memory 1150 may be configured as at least part of the memory 1030 or as a separate memory that is operated independently from the memory 1030.

The image signal processor 1160 may perform one or more image processing with respect to an image obtained via the image sensor 1130 or an image stored in the memory 1150. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1160 may perform control (e.g., exposure time control or read-out timing control) with respect to at least one (e.g., the image sensor 1130) of the components included in the camera module 1080. An image processed by the image signal processor 1160 may be stored back in the memory 1150 for further processing, or may be provided to an external component (e.g., the memory 1030, the display device 1060, the electronic device 1002, the electronic device 1004, or the server 1008) outside the camera module 1080. According to an embodiment, the image signal processor 1160 may be configured as at least part of the processor 1020, or as a separate processor that is operated independently from the processor 1020. If the image signal processor 1160 is configured as a separate processor from the processor 1020, at least one image processed by the image signal processor 1160 may be displayed, by the processor 1020, via the display device 1060 as it is or after being further processed.

According to an embodiment, the electronic device 1001 may include a plurality of camera modules 1080 having different attributes or functions. In such a case, at least one of the plurality of camera modules 1080 may form, for example, a wide-angle camera and at least another of the plurality of camera modules 1080 may form a telephoto camera. Similarly, at least one of the plurality of camera modules 1080 may form, for example, a front camera and at least another of the plurality of camera modules 1080 may form a rear camera.

As described above, an electronic device (e.g., the electronic device 100 of FIG. 2) of an embodiment may include a camera (e.g., the camera 180 of FIG. 2), a memory (e.g., the memory 230 of FIG. 2), and at least one processor (e.g., the processor 210 of FIG. 2). The at least one processor may execute a neural network model for providing an image, the neural network model including a first group (e.g., the first group 211_1 of FIG. 2) including at least a first computation layer among a plurality of computation layers and a second group (e.g., the second group 211_2 of FIG. 2) including at least a second computation layer among the plurality of computation layers. The at least one processor may consecutively obtain a plurality of frames by using the camera. The at least one processor may present a first frame among the plurality of frames to the first group of the neural network model, as a first input, and store first result data corresponding to the first input in the memory. The at least one processor may present the first frame to the second group, as a second input, and determine whether a second computation parameter of the second group is the same as a first computation parameter of the first group. The at least one processor, in response to the second computation parameter and the first computation parameter being the same, obtain (outputs, uses, accesses, provides, substitutes) the first result data as second result data corresponding to the second input, without performing a neural network computation that is based on the second group. The at least one processor, in response to the second computation parameter and the first computation parameter being different from each other, performs the neural network computation, based on the computation parameter of the second group, and obtains second result data. The second result data may be distinct (different) from the first result data.

According to an embodiment, the neural network model may further include a third group including at least a third computation layer among the plurality of computation layers. The at least one processor may present a second frame consecutive to the first frame among the plurality of frames to the first group of the neural network model, as a third input, and obtain third result data corresponding to the third input. The at least one processor may provide the image, as a result image, based on the second result data of the first frame and the third result data of the second frame. The result image is generated based on the second result data and the third result data.

According to an embodiment, the at least one processor may store the third result data in the memory.

According to an embodiment, the electronic device may further include a display, and the at least one processor may displays the result image through the display.

According to an embodiment, the at least one processor may determine whether a computation structure of the first group and a computation structure of the second group are the same as each other.

According to an embodiment, in response to the computation structure of the first group and the computation structure of the second group being the same, the at least one processor may omit (bypass, skip) the execution of a neural network computation that is based on the second group.

According to an embodiment, the first computation parameter and the second computation parameter may be at least one of a weight value and/or a bias value which are used for a convolution computation.

According to an embodiment, when a computation structure of the first group is the same as at least a portion of a computation structure of the second group, the at least one processor may obtain the first result data as intermediate result data of up to the same portion as the at least portion of the second group.

According to an embodiment, the first computation layer and the second computation layer may include at least a convolution layer.

According to an embodiment, the at least one processor may provide reuse information about the first result data, in storing the first result data in the memory.

As described above, a method of operating an electronic device may include consecutively obtaining a plurality of frames by using a camera, and presenting a first frame among the plurality of frames to a first group of a neural network model, as a first input, and storing first result data corresponding to the first input in a memory. The method further includes presenting the first frame to a second group, as a second input, and determining whether a second computation parameter of the second group is the same as a first computation parameter of the first group. The method further includes, in response to determining that the second computation parameter and the first computation parameter are the same as each other, obtaining the first result data as second result data corresponding to the second input, without performing a neural network computation that is based on the second group. The method further includes, in response to determining that the second computation parameter and the first computation parameter are different from each other, performing the neural network computation, based on the computation parameter of the second group, and obtaining second result data. The second result data may be distinguished (different) from the first result data.

According to an embodiment, the method may include presenting a second frame consecutive to the first frame among the plurality of frames to the first group of the neural network model, as a third input, and obtaining third result data corresponding to the third input. The method further includes generating an image, based on the second result data of the first frame and the third result data of the second frame.

According to an embodiment, the method may include storing the third result data in the memory.

According to an embodiment, the method may include displaying the image through a display.

According to an embodiment, the method may include determining whether a computation structure of the first group and a computation structure of the second group are the same as each other.

According to an embodiment, the method may include, in response to determining that the computation structure of the first group and the computation structure of the second group are the same as each other, omitting the execution of a neural network computation that is based on the second group.

According to an embodiment, the first computation parameter and the second computation parameter may be at least one of a weight value and a bias value which are used for a convolution computation.

According to an embodiment, the method may include, in response to determining that a computation structure of the first group is the same as at least a portion of a computation structure of the second group, obtaining the first result data as intermediate result data of up to the same portion as the at least portion of the second group.

According to an embodiment, a first computation layer included in the first group and a second computation layer included in the second group may include at least a convolution layer.

According to an embodiment, the method may include providing reuse information about the first result data, in storing the first result data in the memory.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:

a camera;

a memory; and at least one processor, wherein the at least one processor is configured to:

execute a neural network model for providing an image, the neural network model comprising a first group comprising at least a first computation layer among a plurality of computation layers and a second group comprising at least a second computation layer among the plurality of computation layers;

consecutively obtain a plurality of frames by using the camera;

in a first computation stage of the neural network model, present a first frame among the plurality of frames to the first group of the neural network model, as a first input;

store first result data corresponding to the first input in the memory;

in a second computation stage of the neural network model, determine whether a second computation parameter of the second group is the same as a first computation parameter of the first group;

if it is determined that the second computation parameter and the first computation parameter are the same, obtain the first result data as second result data corresponding to a second input, without performing a neural network computation that is based on the second group;

if it is determined that the second computation parameter and the first computation parameter are different from each other, present the first frame to the second group, as a second input, and perform the neural network computation, based on the second computation parameter of the second group, and obtain second result data distinguished from the first result data;

present a second frame consecutive to the first frame among the plurality of frames to the first group of the neural network model, as a third input;

obtain third result data corresponding to the third input; and generate an image, based on the second result data of the first frame and the third result data of the second frame.

2. The electronic device of claim 1, wherein the neural network model further comprises a third group comprising at least a third computation layer among the plurality of computation layers.

3. The electronic device of claim 2, wherein the at least one processor stores the third result data in the memory.

4. The electronic device of claim 2, further comprising a display, wherein the at least one processor displays the image through the display.

5. The electronic device of claim 1, wherein the at least one processor determines whether a computation structure of the first group and a computation structure of the second group are the same as each other.

6. The electronic device of claim 5, wherein, in response to determining that the computation structure of the first group and the computation structure of the second group are the same as each other, the at least one processor omits the execution of a neural network computation that is based on the second group.

7. The electronic device of claim 1, wherein the first computation parameter and the second computation parameter are at least one of a weight value and/or a bias value which are used for a convolution computation.

8. The electronic device of claim 1, wherein, in response to determining that a computation structure of the first group is the same as at least a portion of a computation structure of the second group, the at least one processor obtains the first result data as intermediate result data of up to the same portion as the at least the portion of the second group.

9. The electronic device of claim 1, wherein the first computation layer and the second computation layer comprise at least a convolution layer.

10. The electronic device of claim 1, wherein the at least one processor provides reuse information about the first result data, in storing the first result data in the memory.

11. A method of operating an electronic device, the method comprising:

consecutively obtaining a plurality of frames by using a camera;

in a first computation stage of a neural network model, presenting a first frame among the plurality of frames to a first group of the neural network model, as a first input;

storing first result data corresponding to the first input in a memory;

in a second computation stage of the neural network model, determining whether a second computation parameter of a second group is the same as a first computation parameter of the first group;

if it is determined that the second computation parameter and the first computation parameter are the same as each other, obtaining the first result data as second result data corresponding to a second input, without performing a neural network computation that is based on the second group;

if it is determined that the second computation parameter and the first computation parameter are different from each other, presenting the first frame to a second group, as a second input, and performing the neural network computation, based on the second computation parameter of the second group, and obtaining second result data distinguished from the first result data;

presenting a second frame consecutive to the first frame among the plurality of frames to the first group of the neural network model, as a third input;

obtaining third result data corresponding to the third input; and generating an image based on the second result data of the first frame and the third result data of the second frame.

12. The method of claim 11, further comprising storing the third result data in the memory.

13. The method of claim 11, further comprising displaying the image through a display.

14. The method of claim 11, further comprising determining whether a computation structure of the first group and a computation structure of the second group are the same as each other.

15. The method of claim 14, further comprising, when the computation structure of the first group and the computation structure of the second group are the same as each other, omitting the execution of a neural network computation that is based on the second group.

16. The method of claim 11, wherein the first computation parameter and the second computation parameter are at least one of a weight value and a bias value which are used for a convolution computation.

17. The method of claim 11, comprising, when a computation structure of the first group is the same as at least a portion of a computation structure of the second group, obtaining the first result data as intermediate result data of up to the same portion as the at least the portion of the second group.

18. The method of claim 11, wherein a first computation layer comprised in the first group and a second computation layer comprised in the second group comprise at least a convolution layer.

19. The method of claim 11, comprising providing reuse information about the first result data, in storing the first result data in the memory.

* * * * *